(12) United States Patent
Cai et al.

(10) Patent No.: US 7,864,745 B2
(45) Date of Patent: Jan. 4, 2011

(54) DATA TRANSMITTING METHOD WITH HYBRID AUTOMATIC REPEAT REQUEST IN MULTI-CARRIER SYSTEM

(75) Inventors: Liyu Cai, Shanghai (CN); Yan Wan, Shanghai (CN); Pengpeng Song, Shanghai (CN)

(73) Assignee: Alcatel, Paris (FR)

( * ) Notice: Subject to any disclaimer, the term of this patent is extended or adjusted under 35 U.S.C. 154(b) by 1732 days.

(21) Appl. No.: 11/002,286

(22) Filed: Dec. 3, 2004

(65) Prior Publication Data

US 2005/0135253 A1    Jun. 23, 2005

(30) Foreign Application Priority Data

Dec. 19, 2003    (CN) .................... 2003 1 0122727

(51) Int. Cl.
*H04J 1/00* (2006.01)
(52) U.S. Cl. .................. 370/343; 370/465; 370/480; 714/746
(58) Field of Classification Search .............. 370/343, 370/480, 465; 714/746
See application file for complete search history.

(56) References Cited

U.S. PATENT DOCUMENTS

| | | | | |
|---|---|---|---|---|
| 2002/0041637 | A1* | 4/2002 | Smart et al. ............. | 375/316 |
| 2002/0049068 | A1* | 4/2002 | Koo et al. ............... | 455/522 |
| 2003/0035403 | A1* | 2/2003 | Choi et al. ............... | 370/342 |
| 2003/0095508 | A1 | 5/2003 | Kadous | |
| 2004/0116143 | A1* | 6/2004 | Love et al. ............... | 455/522 |
| 2005/0032514 | A1* | 2/2005 | Sadri et al. .............. | 455/423 |
| 2006/0084475 | A1* | 4/2006 | Ohkubo et al. ........... | 455/562.1 |

FOREIGN PATENT DOCUMENTS

WO    WO 02/37872 A2    5/2002

OTHER PUBLICATIONS

H. Atarashi et al, "An Efficient ARQ Scheme for Multi-Carrier Modulation Systems Based on Packet Combining", IEICE Transactions on Communications, Communications Society, Tokyo, Japan, vol. E82-B, No. 5, May 1999, pp. 731-739, XP000940234.
L. Litwin et al, "The Principles of OFDM", RF Design, Primedia Business Magazines & Media, Overland park, KS, US, vol. 24, No. 1, Jan. 2001, p. 30, 32, 34, 36, 38, 40, 42, 46, 48, XP001058704.
Cai Liyu et al, "Improved HARQ scheme using channel quality feedback for OFDM systems", Vehicular Technology Conference, 2004. VTC 2004-Spring. 2004 IEEE 59$^{th}$ Milan, Italy, May 17-19, 2004, Piscataway, NJ, USA, IEEE, May 17, 2004, pp. 1869-1872, XP010766485.

* cited by examiner

*Primary Examiner*—Kevin C Harper
(74) *Attorney, Agent, or Firm*—Sughrue Mion, PLLC

(57) ABSTRACT

The present invention provides a data transmitting method with hybrid automatic repeat request in multi-carrier system. In this method, the signal-to-noise ratios of respective sub-carriers are compared with a threshold, the data on the sub-carriers having the signal-to-noise ratios lower than the threshold are selectively retransmitted by mapping these data onto the sub-carriers having the good channel conditions, and then the retransmitted data are combined hybrid-automatically in the receiver of the opposite terminal. By using the method the system throughput can be enhanced effectively without impairing the bit error rate of the system.

19 Claims, 7 Drawing Sheets

DATA TRANSMITTING METHOD WITH HYBRID AUTOMATIC REPEAT REQUEST IN MULTI-CARRIER SYSTEM

CROSS-REFERENCE TO RELATED APPLICATION(S)

This application is based on the Chinese Patent Application No. 200310122727.9 filed on Dec. 19, 2003, the disclosure of which is hereby incorporated by reference thereto in its entirety, and the priority of which is hereby claimed under 35 U.S.C. §119.

FIELD OF THE INVENTION

The present invention relates to mobile communication system, and more particularly, to a data transmitting method in multi-carrier system.

BACKGROUND OF THE INVENTION

In order to ensure the reliable and effective transmission of various kinds of information in a channel, it is usual to adopt an error control encoding technology in a modern digital communication system. The error controlling method in the digital communication is basically divided into two types, that is, an automatic repeat request (ARQ) system and a forward error correction (FEC) system. The advantage of the FEC communication system is that only one one-way-channel is required and the system has the high transmitting efficiency. However, there are some disadvantages in the FEC system, that is, the reliability of the FEC communication system is not high because the mistaken information will be sent to subscriber when some mistakes occur in decoding; and it is necessary to use the long code and select the code group having the high error correcting ability in order to obtain the high system reliability, causing the complex decoding circuit and the high manufacturing cost.

Compared with the FEC communication system, the ARQ communication system has the simple structure and the high reliability, however, it is necessary to provide a reverse channel and the transmitting efficiency will be very low when the channel condition becomes poor (i.e. the error-rate is too high) because the system is often in a requesting state.

In view of the respective advantages and disadvantages of the FEC and ARQ systems, a hybrid ARQ communication system is constituted by combining the FEC and ARQ systems properly. In the hybrid ARQ system, the ARQ mechanism is combined with FEC, so that both reliability and transmitting efficiency of the system can be increased. In a hybrid ARQ solution realized by Chase combining of the prior art, the acknowledgement (ACK)/negative acknowledgement (NACK) indications will be fed back from the receiver of the opposite communication terminal to the transmitter of the local terminal according to the CRC checking result so as to determine whether the retransmission is necessary. If the retransmission is necessary, the whole block of data transmitted before must be transmitted again. In the receiver, the block of data transmitted again is weighted according to the signal-to-noise ratio during correspondingly transmission interval and combined together again. Then the combined block of data is soft-input to the decoder of the channel for decoding in channel. The famous Chase combining method above-mentioned, which realizes the hybrid ARQ, can effectively enhance the link performance.

In the Chase combining method, however, the system throughput is not optimized very well because the whole block of data is transmitted repeatedly during each retransmission. In fact, it is unnecessary because the transmitted signals are subjected to the different channel attenuations in a mobile environment. Some parts of signals in the block of data will be transmitted in high signal-to-noise ratios, and other parts will be transmitted in low signal-to-noise ratios. In fact, only the signals being in a poor channel condition need to be retransmitted because the code-error-rate depends always on the signals being attenuated more seriously, if so, the efficiency of the whole system will be increased.

SUMMARY OF THE INVENTION

In view of the above fact, the object of the invention is to provide a data transmitting method in which the data can be retransmitted more effectively. The basic principle of the invention is that only the signals being in a poorer channel condition are selected to be retransmitted so as to reduce the magnitude of the data to be retransmitted. By using the method the system throughput can be increased effectively without impairing the bit error rate of the system. However, this principle is difficult to realize in a single carrier transmitting system, because it is difficult to extract the information of the channel condition corresponding to each transmitted signal in a single carrier transmitting system. In a multi-carrier transmitting system such as orthogonal frequency dividing multiplex (OFDM) system, the principle of the invention can be effected more easily because the data symbol is modulated onto a sub-carrier of OFDM, the signal-to-noise ratio of each sub-carrier can be measured, and the value of the signal-to-noise ratio represents the channel quality when the data are carried by the sub-carrier. The method of this invention comprises the following steps of:

a. a transmitter of a local terminal transmitting data to a receiver of an opposite communication terminal, and the receiver of the opposite terminal receiving the data, estimating the signal-to-noise ratios of respective sub-carriers for carrying the data, feeding back the signal-to-noise ratios of respective sub-carriers to a transmitter through the transmitter of the opposite terminal and a receiver of the local terminal, weighting the received data, storing them and providing them to the receiver of the opposite terminal for judging;

b. The receiver of the opposite terminal judging whether the data are correct, and outputting the data and sending an acknowledgement (ACK) indication to the transmitter of the local terminal through the transmitter of the opposite terminal and the receiver of the local terminal if the data are correct or sending a negative acknowledgement (NACK) indication to the transmitter of the local terminal through the same route if the data are incorrect;

c. When receiving the acknowledgement (ACK) indication, the transmitter of the local terminal getting new data as the data to be transmitted and then returning to step a;

d. When receiving the negative acknowledgement (NACK) indication, the transmitter of the local terminal comparing the signal-to-noise ratios of respective sub-carriers for carrying the data fed back from the receiver of the opposite terminal with a threshold, picking out the sub-carriers having the signal-to-noise ratios lower than the threshold, mapping again the data carried by the sub-carriers having the signal-to-noise ratios lower than the threshold onto other sub-carriers having the higher signal-to-noise ratios according to certain rule and retransmits them to the receiver of the opposite terminal;

e. The receiver of the opposite terminal receiving the data, estimating the signal-to-noise ratios of respective sub-carriers for carrying the data and feeding back the signal-to-noise ratios of respective sub-carriers to the transmitter of the local terminal through the transmitter of the opposite terminal and the receiver of the local terminal, at the same time, comparing the signal-to-noise ratios of the respective sub-carriers transmitted last time with the same threshold as in the transmitter of the local terminal, picking out retransmitted data according to the same rule as that in the step d, weighting the retransmitted data, and combining the weighted data with the data which are processed before, storing them and providing them to the receiver of the opposite terminal for judging, then returns to step b. This method further comprises a step for forward error correction (FEC) encoding the data to be transmitted before the transmitter of the local terminal transmits the data to the receiver of the opposite terminal in step a, at the same time, the manner of the forward error correction (FEC) encoding needs to adaptive modulate according to the values of the fed back signal-to-noise ratios of the respective sub-carriers.

In this method, the threshold of the signal-to-noise ratio in step d is obtained through simulation and can be fed back along with the NACK indication from the opposite terminal to the transmitter of the local terminal.

The steps for estimating the signal-to-noise ratios of respective sub-carriers in step a and step e can include the steps for predicting the channel after the signal-to-noise ratios of the received data are estimated and adjusting the values of the signal-to-noise ratios according to the predicting result of the future channel performance. In this method, the sub-carriers which are not used to map the data to be retransmitted in step d are used to carry new data of the subscriber, or allocated dynamically to other subscribers in the case of the multi-subscriber multiplex.

The sub-carrier in the method of the invention can be substituted by sub-bands, and a signal-to-noise ratio of a sub-band is the average value of signal-to-noise ratios of all the sub-carriers in the sub-band.

The present invention also provides an orthogonal frequency dividing multiplex communication system comprising a transmitter and a receiver, wherein the transmitter comprising a transmitter buffer unit and a multiplexing unit, the receiver comprising a signal-to-noise ratio estimating unit, a receiver buffer unit, a de-multiplexing unit, a HARQ combining unit and a CRC checking unit. The communication system further comprises a retransmission controller connected with the transmitter buffer unit and the multiplexing unit, and a de-multiplex controller coupled with the signal-to-noise ratio estimating unit and connected with the de-multiplexing unit and the CRC checking unit, wherein the retransmission controller is used to control the transmitter buffer unit to obtain new data and to control the multiplexing unit to map the new data to be transmitted when obtaining the ACK indication fed back from the opposite communication terminal; to compare the signal-to-noise ratios of respective sub-carriers for carrying the data fed back from the signal-to-noise ratio estimating unit of the receiver of the opposite communication terminal with a threshold to pick out the sub-carriers having the signal-to-noise ratios lower than the threshold and to control the multiplexing unit to map the data carried by the sub-carriers having the signal-to-noise ratios lower than the threshold onto other sub-carriers having the higher signal-to-noise ratios for retransmission according to a certain rule when receiving the NACK indication fed back from the receiver of the opposite communication terminal, and wherein the de-multiplex controller is used to control the de-multiplexing unit to send the de-multiplexed data to the HARQ combining unit when obtaining the ACK indication output from the CRC checking unit; to compare the signal-to-noise rations of the respective sub-carriers transmitted last time sent from the signal-to-noise estimating unit with the same threshold as that in the transmitter of the opposite terminal, and to control the de-multiplexing unit to send the de-multiplexed data of the retransmitted data to the HARQ combining unit according to the same rule as in the transmitter of the opposite terminal in the case of the receiver receiving the retransmitted data, when obtaining the NACK indication output from the CRC checking unit. In this system, the receiver buffer unit clears the data which are processed before and stored therein for HARQ combining when obtaining the ACK indication output from the CRC checking unit; the HARQ combining unit weights the data processed by said de-multiplexing unit, combines the weighted data with the data which are processed before and stored in the receiver buffer unit, and then stores the processed data in the receiver buffer unit; when obtaining the ACK indication, the receiver outputs the data checked by the CRC checking unit.

The advantages of this invention are summed up as follows:

1) The solution of the invention reduces the amount of the data to be retransmitted without impairing the bit error rate. The saved resources can be used to transmit new subscriber data or to transmit the data of other subscribers in an OFDMA system. Compared with the prior art, this solution can increase significantly the system throughput.

2) The solution will not bring much overhead in the air interface. The useful information required in the solution is the SNR feedback of the channel. This information is not added especially for this solution because it is needed during adaptive modulation and coding as well. Therefore, the solution will not bring additional overhead for the air interface. In this solution, the SNR threshold is just fed back from the receiver to the transmitter, so that the cost for the signal and the command can almost be ignored.

3) The complexity during combining will be decreased because only a part of data, rather than the whole, must be weighted, so that the number of the calculations of addition and multiplication can be reduced.

4) The number of the retransmission can also be reduced because the data to be retransmitted are always be mapped onto the sub-carriers having the good channel conditions by the retransmission controller.

BRIEF DESCRIPTION ON THE DRAWINGS

DESCRIPTION OF THE PREFERRED EMBODIMENTS

The present invention will be further described with reference to the accompanying drawings and the embodiments.

Figure 1:
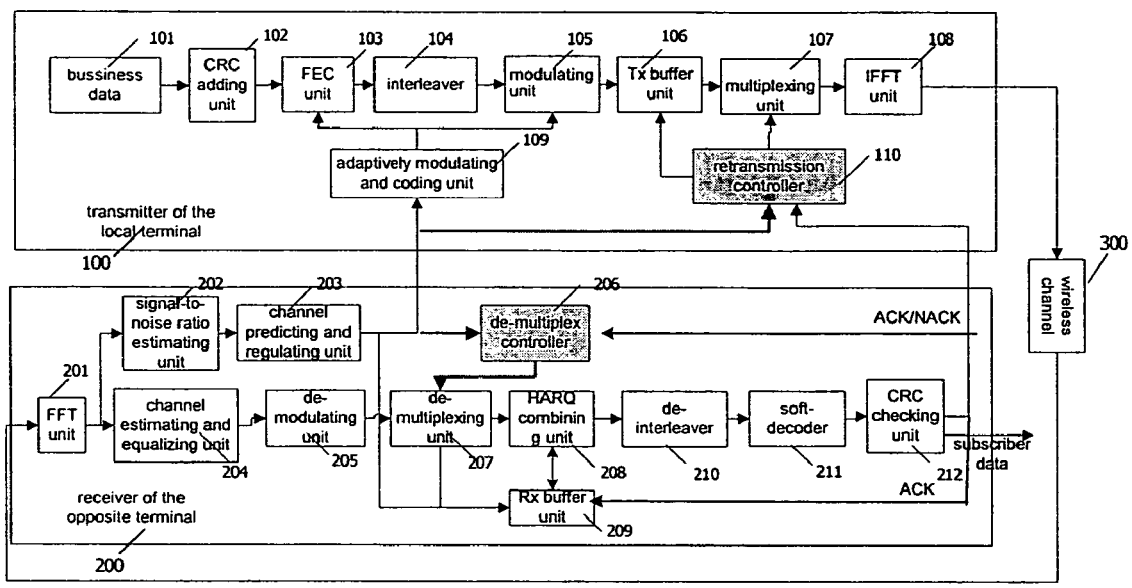
FIG. 1 is a schematic diagram of the structures of the transmitter and the receiver realizing the data transmitting method with hybrid automatic repeat request of this invention in an OFDM system.

FIG. 1 is a schematic diagram of the structures of the relevant transmitter and the receiver realizing the data transmitting method with hybrid automatic repeat request (HARQ) of this invention in an OFDM system. In this embodiment, the orthogonal frequency dividing multiplexing (OFDM) system is used as a multi-carrier system. A transmitter 10 of the local terminal and a receiver 20 of the opposite communication terminal in an OFDM system are shown in FIG. 1. The whole system adopts adaptive modulating and coding manner and HARQ solution to enhance the link performance. HARQ solution adopts the improved Chase combining method proposed by the invention. An acknowledgement (ACK) or negative acknowledgement (NACK) indications will be fed back to transmitter 10 of the local terminal through the transmitter (not shown) of the opposite terminal and the receiver (not shown) of the local terminal to determine whether the retransmission is necessary.

In this OFDM system, the data symbols are modulated onto the sub-carriers of OFDM, so that the signal-to-noise ratio (SNR) of each sub-carrier can be measured and the value of the signal-to-noise ratio represents the channel quality when the data are carried by the sub-carrier. Because of the performance of the OFDM system, adaptive modulating and coding can be realized very easily in the sub-carriers or the sub-bands according to the measuring result of SNR of the sub-carriers. In this solution, the data which are attenuated seriously are selectively transmitted according to the measuring result of SNR of the sub-carriers of OFDM and retransmitted in the case that the retransmission is necessary so as to reduce the amount of the data to be retransmitted and increase the system throughput. As shown in FIG. 1, transmitter 10 of the local terminal performs a series of processes for data and transmits them from its transmitting unit (not shown) to receiver 20 of the opposite terminal through wireless channel 300. Receiver 20 of the opposite terminal performs a series of processes for the received data and its CRC checking unit 212 judges whether the data are correct.

When judging that the data received by receiver 20 are correct, CRC checking unit 212 outputs the subscriber data and sends an ACK indication to retransmission controller 110 of transmitter 10 through the transmitter (not shown) of the opposite terminal and the receiver (not shown) of the local terminal. When receiving the acknowledgement (ACK) indication, retransmission controller 110 makes transmitter (Tx) buffer unit 106 get the subscriber data output from modulating unit 105 in unit of block of data. Before doing this, transmitter 10 of the local terminal must perform a series of processes for the data: firstly, circle redundancy check (CRC) adding unit 102 of transmitter 10 of the local terminal adds CRC to business data 101; then, the CRC added data are sent to forward error correcting (FEC) unit 103 for correcting and coding, and then are processed by interleaver 104 and modulating unit 105; and at the same time, during performing the above series of processes, adaptive modulating and coding unit 109 changes the coding manner of forward error correcting unit 103 and the modulating exponent number of modulating unit 105 according to the channel condition fed back from signal-to-noise ratio estimating unit 202 of receiver 20 of the opposite terminal through the transmitter (not shown) of the opposite terminal and the receiver (not shown) of the local terminal so as to adopt the proper coding manner and modulating exponent number according to the channel condition and perform adaptive modulating and coding. Then, after obtaining the subscriber data, transmitter buffer unit 106 sends the stored subscriber data to multiplexing unit 107 for multiplexing and mapping in OFDM. Multiplexing unit 107 sends the multiplexed and mapped data to IFFT unit 108. Finally, IFFT unit 108 transmits the data from the transmitting unit (not shown) of transmitter 10 of the local terminal to wireless channel 300 for receiving by receiver 20 of the opposite terminal.

In receiver 20 of the opposite terminal, if CRC checking unit 212 judges that the data received by the receiver 20 are correct, an ACK indication will also be fed back to de-multiplex controller 206 and Rx buffer unit 209. When receiving the ACK indication, receiver buffer unit 209 clears a part of data stored in the buffer-storing unit for HARQ combining, and de-multiplex controller 206 controls de-multiplexing unit 207 to input the de-multiplexed data to HARQ combining unit 208. Before doing this, receiver 20 of the opposite terminal must perform a series of processes for the data received from wireless channel 300 through its receiving unit (not shown): firstly, the data passing through FFT unit 201 are sent to channel estimating and equalizing unit 204 and signal-to-noise ratio estimating unit 202 respectively; channel estimating and equalizing unit 204 inputs the processed data to de-modulating unit 205 for de-modulating and then inputs the de-modulated data to de-multiplexing unit 207; signal-to-noise ratio estimating unit 202 estimates the signal-to-noise ratios of the respective sub-carriers according to the input data and transmits the result to adaptive modulating and coding unit 109 and retransmission controller 110 of transmitter 10 of the local terminal respectively through the transmitter (not shown) of the opposite terminal and the receiver (not shown) of the local terminal; and also transmits the result to de-multiplex controller 206 and receiver (Rx) buffer unit 209 of receiver 20 of the opposite terminal. Then, de-multiplex controller 206 stores the received signal-to-noise ratio values of the respective sub-carriers in its own buffer-storing unit (not shown). HARQ combining unit 208 weights the de-multiplexed data with the average value of the signal-to-noise ratios of respective sub-carriers during transmitting obtained from receiver buffer unit 209, and combines them with a part of data stored in receiver buffer unit 209 for HARQ combining, and then the weighted and combined data are stored in receiver buffer unit 209. Because a part of data stored in receiver buffer unit 209 for HARQ combining has been cleared under the action of the ACK indication, the subscriber data received just after the ACK indication are combined with zero indeed. Therefore, the subscriber data received just after the ACK indication may not be combined in HARQ combining unit 208. This action of HARQ combining unit 208 can also be controlled by applying an ACK indication to it. Then, the data processed by HARQ combining unit 208 pass through de-interleaver 210 and soft-decoder 211 sequentially. Soft-decoder 211 outputs the soft-decoded data to CRC checking unit 212, and CRC checking unit 212 judges whether the soft-decoded data are correct, to obtain the acknowledgement (ACK) indication if the data are correct or to obtain the negative acknowledgement (NACK) indication if the data are incorrect, and the corresponding operations will be performed according to the checking result.

When judging that the data received by receiver 20 are incorrect, CRC checking unit 212 sends a NACK indication to retransmission controller 110 of transmitter 10 through the transmitter (not shown) of the opposite terminal and the receiver (not shown) of the local terminal. When receiving the NACK indication, retransmission controller 110 compares the signal-to-noise ratio (SNR) of each sub-carrier with a threshold (SNR_threshold) according to the signal-to-noise ratios of respective sub-carriers during transmitting sent from signal-to-noise ratio estimating unit 202 of receiver 20 of the opposite terminal to retransmission controller 110 and pick outs the index of sub-carrier having the signal-to-noise ratio lower than the threshold. The data which are mapped onto these sub-carriers transmitted last time are read out from transmitter buffer unit 106 as the data to be retransmitted. At the same time, these sub-carriers are classified according to the signal-to-noise ratio information of respective sub-carriers fed back from signal-to-noise ratio estimating unit 202, and the sub-carriers having the good channel conditions are selected to carry the data to be retransmitted. Under the control of retransmission controller 110, multiplexing unit 107 maps the data to be retransmitted onto the sub-carriers having the good channel conditions. The remaining sub-carriers can be used to carry new subscriber data or can be dynamically allocated to other subscribers in an orthogonal frequency dividing multiplex addresses (OFDMA) system. The block of data processed by multiplexing unit 107 passes through IFFT unit 108 and is transmitted from the transmitting unit (not shown) of transmitter 10 to wireless channel 300 for receiving by receiver 20 of the opposite terminal.

In receiver 20 of the opposite terminal, if CRC checking unit 212 judges that the data received by receiver 20 are incorrect, the NACK indication will also be fed back to de-multiplex controller 206. De-multiplex controller 206 compares the signal-to-noise ratios of respective sub-carriers transmitted last time stored in its buffer unit with the same threshold (SNR_threshold) as that in transmitter 10 of the local terminal and judges which sub-carriers have the retransmitted data according to the same rule as that in transmitter 10 of the local terminal. Then, de-multiplex controller 206 controls de-multiplexing unit 207 to send the de-multiplexed data of the retransmitted part to HARQ combining unit 208 and to store the data of the not-retransmitted part in receiver buffer unit 209. Before doing this, receiver 20 of the opposite terminal must perform a series of processes for the data received from wireless channel 300 through its receiving unit (not shown): the data passing through FFT unit 201 are sent to signal-to-noise ratio estimating unit 202 and channel estimating and equalizing unit 204; signal-to-noise ratio estimating unit 202 estimates the signal-to-noise ratios of respective sub-carriers according to the input data and transmits the result to adaptive modulating and coding unit 109 and retransmission controller 110 of transmitter 10 respectively through the transmitter (not shown) of the opposite terminal and the receiver (not shown) of the local terminal, and also transmits the result to de-multiplex controller 206 and receiver buffer unit 209 of receiver 20 of the opposite terminal; channel estimating and equalizing unit 204 sends the processed data to de-modulating unit 205 for de-modulating and then sends them to de-multiplexing unit 207. Then, HARQ combining unit 208 reads out the signal-to-noise ratios of respective sub-carriers transmitted this time from receiver buffer-storing unit 209, weights the de-multiplexed retransmitted data with the signal-to-noise ratios of respective sub-carriers transmitted this time, combines them with the corresponding data which are processed before and stored in receiver buffer unit 209, and stores the combined data in receiver buffer unit 209. HARQ combining unit 208 inputs the processed data to de-interleaver 210 and soft-decoder 211, the soft-decoded data are CRC checked to obtain the ACK indication or NACK indication, and the corresponding operations will be performed according to the CRC checking result.

Generally, in the case that a mobile phone communicates with a base station, there is a certain delay because the channel performance is fed back by the mobile phone to the base station, so that the fed back information of the channel performance received by the base station can not likely represent the current actual channel performance when the channel changes very quickly. In the solution of the invention, in order to increase the compatibility with the method for estimating the SNR of the attenuated channel and to compensate the feedback delay, channel predicting and regulating unit 203 can be added to follow signal-to-noise ratio estimating unit 202 of the receiver of the opposite terminal, this module can be used to predict the channel performance in advance and regulate the values of the signal-to-noise ratios obtained by signal-to-noise ratio estimating unit 202. The regulated signal-to-noise ratios of respective sub-carriers are input to adaptive modulating and coding unit 109 and retransmission controller 110 of transmitter 10 and de-multiplex controller 206 and receiver buffer unit 209 of receiver 20 of the opposite terminal for processing sequentially to achieve better performance. If this unit is added, the system performance in a moving environment with high speed can be further increased.

Figure 2:
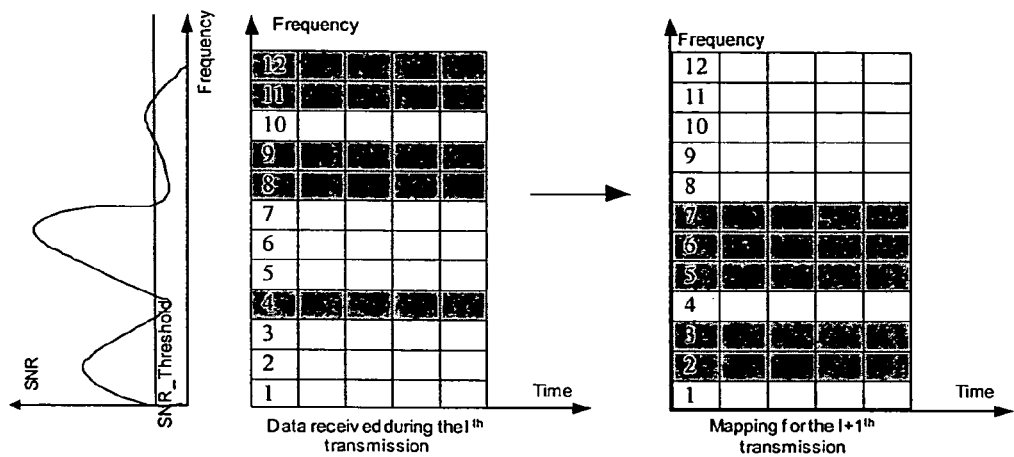
FIG. 2 is a schematic diagram of selecting and mapping the data to be retransmitted in the embodiment of the invention.

Now the functions of the main modules of transmitter and receiver realizing the method of the invention will be described in detail with reference to FIG. 2, FIG. 3 and FIG. 4. Suppose that receiver 20 of the opposite terminal receives a block of data constituted of five OFDM data symbols, which is transmitted the $i^{th}$ time, these OFDM data symbols being OFDM modulated with 12 sub-carriers. Suppose that the CRC checking unit judges the data are incorrect after the block of data is subjected to a series of processes by receiver 20 of the opposite terminal as shown in FIG. 1. CRC checking unit 212 transmits a NACK indication to retransmission controller 110 of transmitter 10 of the local terminal. FIG. 2 is a schematic diagram of selecting and mapping the data to be retransmitted in the embodiment of the invention. The received block of data can be indicated on a plane of time versus frequency, as shown in FIG. 2(b). The distribution of the signal-to-noise ratios of the sub-carriers which are measured by signal-to-noise ratio estimating unit 202 during receiving these data is shown in FIG. 2(a).

Retransmission controller 110 compares the signal-to-noise ratio of each sub-carrier with a threshold, that is, SNR_threshold. In this embodiment, as shown in FIG. 2, the $4^{th}$, $8^{th}$, $9^{th}$, $11^{th}$ and $12^{th}$ sub-carriers are attenuated highly, causing their signal-to-noise ratios to be lower than the threshold. The data carried by these sub-carriers can be thought as the main reason causing the fact that the block of data is CRC judged to be incorrect. Therefore, only this part of data, rather than whole block of data, needs to be retransmitted. Retransmission controller 110 must select the sub-carriers having the good channel conditions to be used to retransmit these data, and then the mapping operation is performed in multiplexing unit 107. For example, in this embodiment, as shown in FIG. 2(a), the sub-carriers having the highest SNRs are the $6^{th}$, $7^{th}$, $2^{nd}$, $5^{th}$ and $3^{rd}$ in turn. Therefore, the data to be retransmitted can be mapped onto these sub-carriers for retransmission. In this embodiment, mapping is performed in the positive sequence of the series numbers of the sub-carriers from the small to the large according to a certain mapping rule, that is, as shown in FIG. 2 (c), the data on the $4^{th}$, $8^{th}$, $9^{th}$, $11^{th}$ and $12^{th}$ sub-carriers are mapped onto the $2^{nd}$, $3^{rd}$, $5^{th}$, $6^{th}$ and $7^{th}$ sub-carriers respectively, other rules such as the negative sequence or arbitrarily selected arrangement can also be used to map these data. Other sub-carriers will be used to carry new subscriber data or carry the data of other subscribers in an orthogonal frequency dividing multiplex addresses (OFDMA) system. The part with shadow in FIG. 2(c) represents the data on the sub-carriers used for retransmission, and the part without shadow in FIG. 2(c) represents the data on the sub-carriers not used for retransmission.

After receiver 20 of the opposite terminal receives the block of data transmitted the $i+1^{th}$ time, the data are subjected to a series of processes as shown in FIG. 1 and then are input to de-multiplexing unit 207. De-multiplex controller 206 compares the signal-to-noise ratios of respective sub-carriers during transmitting the $i^{th}$ time with the same threshold, that is, SNR_threshold, as that in transmitter 10 of the local terminal and judges which sub-carriers have the retransmitted data according to the same mapping rule as that in transmitter 10 of the local terminal. In this embodiment, the data on the $2^{nd}$, $3^{rd}$, $5^{th}$, $6^{th}$ and $7^{th}$ sub-carriers are the retransmitted data, which are the original data on the $4^{th}$, $8^{th}$, $9^{th}$, $11^{th}$ and $12^{th}$ sub-carriers, and the data on other sub-carriers are the data which are not retransmitted. After these data are de-multiplexed in de-multiplexing unit 207, in HARQ combining unit 208, the data of the retransmitted part, that is, the data on the $2^{nd}$, $3^{rd}$, $5^{th}$, $6^{th}$ and $7^{th}$ sub-carriers are weighted with the SNRs during transmitting the $i+1^{th}$ time and combined with the data which are processed before after being transmitted the $i^{th}$ time and stored in receiver buffer-storing unit 209. The data of the part which is not retransmitted during transmitting the $i+1^{th}$ time are stored in receiver buffer unit 209.

Figure 3:
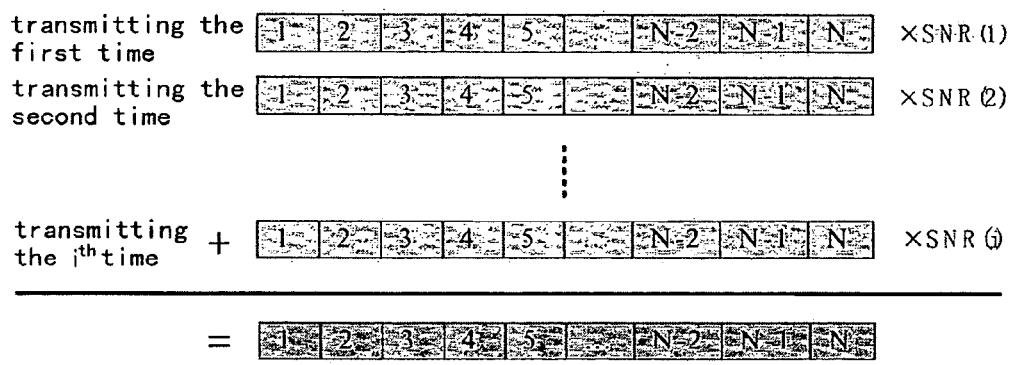
FIG. 3 is a schematic diagram showing the Chase combining method used in a HARQ combining unit of the prior art.
Figure 4:
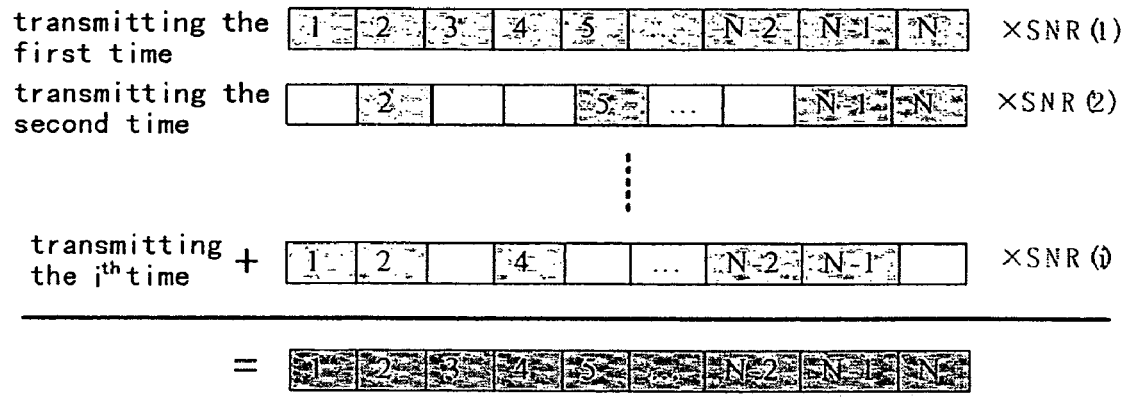
FIG. 4 is a schematic diagram showing the improved combining method used in a HARQ combining unit of this invention.

FIG. 3 is a schematic diagram showing the Chase combining method used in a HARQ combining unit of the prior art, wherein 1, 2, 3, ... N indicate data, SNR (k) is the average value of the SNRs of respective sub-carriers during transmitting the $k^{th}$ (k=1, 2, ... i) time. The data of the block of data are weighted with SNR (k) (k=1, 2, ... i) during its transmitting the $k^{th}$ time firstly, then they are combined with the corresponding data which are processed before and stored in receiver buffer-storing unit 209, and the processed data are stored again in receiver buffer unit 209. FIG. 4 is a schematic diagram showing the improved combining method used in a HARQ combining unit of the invention, wherein 1, 2, ... N indicate data, the parts with shadow indicate the retransmitted data among the data transmitted the 2 nd ... $i^{th}$ time. The retransmitted data are just a part of the data transmitted the first time, and the weighting coefficient SNR(k) during transmitting the $k_{th}$ time is the average value of the SNRs of the sub-carriers for carrying the retransmitted data during transmitting the $k_{th}$ (k=1, 2, ... i) time. The data of the block of data are weighted with SNR(k), then they are combined with the data which are processed before and stored in receiver buffer unit 209, and the processed data are stored in receiver buffer unit 209. The retransmitted data during transmitting the $k_{th}$ time which are input to HARQ combining unit 208 are set to be S(k). For example, during transmitting the first time, k=1, S(1)=1, 2, ... N. As described above, the datum which is processed before indicated this time is 0, so that the data stored in receiver buffer unit 209 are S(1)×SNR(1)+0 after transmitting the first time. During transmitting the second time (i.e. retransmission the first time), k=2, the data which are processed before indicated this time are S(1)×SNR(1), and the data input to HARQ combining unit 208 are S(2), as shown in FIG. 4, S(2)=2, 5, ... N−1, N. Weighting S(2) results in S(2)×SNR(2), which will be combined with the data which are processed before and stored in receiver buffer unit 209, that is, the data among S(1)×SNR(1) which are at the positions corresponding to S(2) are combined with S(2)×SNR(2), while the data at other positions are not changed, resulting in S(1)×SNR(1)+S(2)×SNR(2), which will be stored in receiver buffer unit 209. During transmitting the $i^{th}$ time (i.e. retransmission the $i-1^{th}$ time), k=i, the data which are processed before indicated this time are S(1)×SNR(1)+S(2)×SNR(2)+ . . . S(i−1)×SNR(i−1), and the data input in HARQ combining unit 208 are S(i), as shown in FIG. 4, S(i)=2, . . . N−1. Weighting S(i) results in S(i)×SNR(i), which will be combined with the data which are processed before and stored in receiver buffer-storing unit 209, that is, the data among S(1)×SNR(1)+S(2)×SNR (2)+. . . S(i−1)×SNR(i−1) which are at the positions corresponding to S(i) are combined with S(i)×SNR (i), while the data at other positions are not changed, resulting in S(1)×SNR (1)+S(2)×SNR(2)+ . . . S(i−1)×SNR (i−1)+S(i)×SNR (i), which will be stored in receiver buffer unit 209, and so on. As shown in FIG. 3, in the Chase combining method of the prior art, the whole package must be retransmitted each time, that is, S (k) is the same each time. As shown in FIG. 4, in the improved combining method of the invention, the retransmitted data each time are a part of the original data, that is, S(k) (k=2, 3, . . . i) is a part of S(1). In addition, the weight for each data symbol in one block of data can be replaced by the SNR of the sub-carrier for carrying the data symbol to obtain better performance.

In this solution, when performing combining in the HARQ combining unit, other weighting method can be used, for example, the combination of the SNR and the square difference of the SNR can be used as a weight.

This solution can be extended into a solution in which a sub-band (i.e. a set of sub-carriers) is taken as a unit to be retransmitted, and inside a sub-band the data are not further divided. In this solution in which a sub-band is taken as a smallest unit to be retransmitted, the average value of the signal-to-noise ratios of the respective sub-carriers in the sub-band is taken as the signal-to-noise ratio of the sub-band, other operations being similar to this. Hence, the performance of the system is likely somewhat decreased, but the operations can be simplified in the case that there are a lot of sub-carriers.

Figure 5:
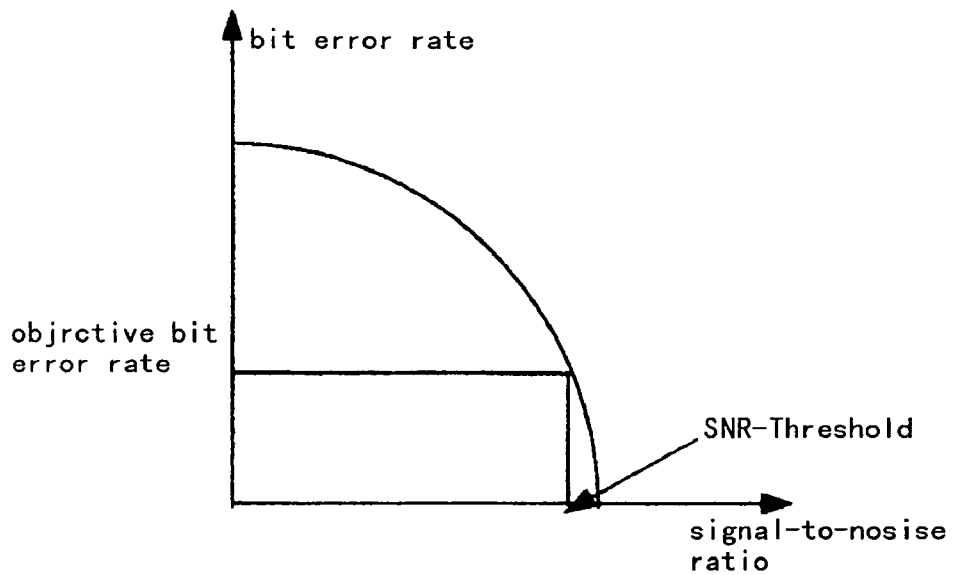
FIG. 5 is a schematic diagram showing the method for selecting the SNR threshold.

The SNR threshold selected for retransmission is a critical parameter, which will influence the performance of the system. The threshold is selected mainly according to the simulation result at present. If a solution for modulating and coding is predetermined, a graph of bit error rate versus signal-to-noise ratio can be obtained by simulation. FIG. 5 is a schematic diagram showing the method for selecting the GNR threshold, and the desired channel SNR can be obtained according to this graph if the objective bit error rate of a transmission is determined. This SNR can be used as a SNR threshold of the present solution, because the sub-carrier having the SNR lower than this value will cause the bit error rate to be higher than the specification and cause channel decoding failure and CRC checking error. The SNR threshold can be stored in advance in the transmitter and the receiver of the local and opposite communication terminals.

During a communication process, the actual SNR threshold can be gradually decreased as the retransmission times increase, because the reliability of the data will increase after several times of transmissions, so that the redundancy required for the next time of retransmission is decreased, and the SNR threshold is decreased as well. Therefore, it is possible to regulate real time the parameters for the simulation calculation according to the channel conditions, feed back the SNR threshold along with the NACK indication to the retransmission controller of the transmitter of the opposite communication terminal and transmit the same to the de-multiplex controller of the receiver of the local terminal through an inner protocol. The overhead in the air interface for feeding back the SNR threshold is so small that it can be almost ignored.

Figure 6:
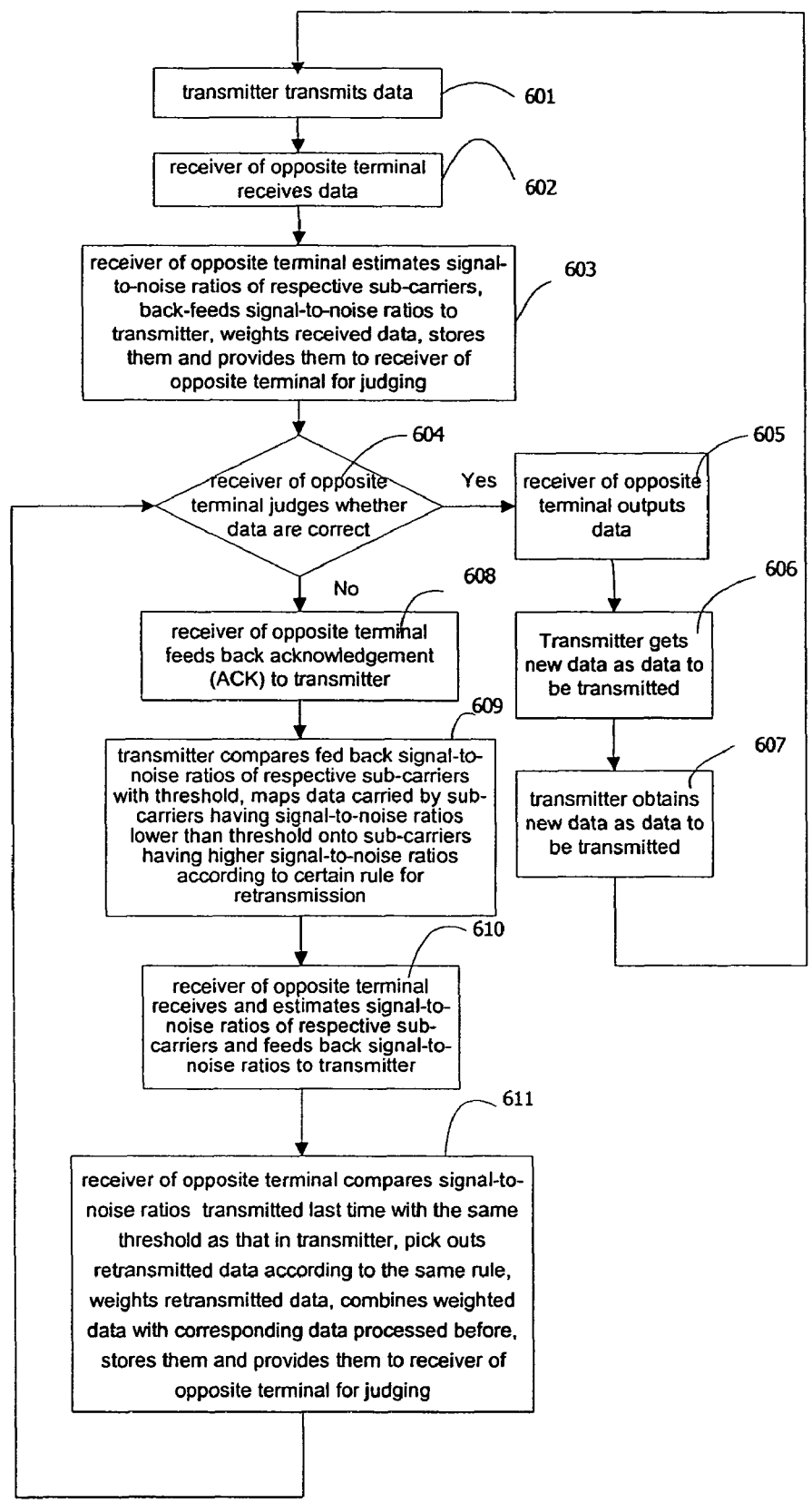
FIG. 6 is a flowchart of the method for realizing this invention.

According to above description of the embodiment, as shown in FIG. 6, the data transmitting method with hybrid automatic repeat request in multi-carrier system of the invention can be summed up into the following steps:

a. a transmitter of a local terminal transmits data to a receiver of an opposite communication terminal (step 601); the receiver of the opposite terminal receives the data (step 602); the receiver of the opposite terminal estimates the signal-to-noise ratios of respective sub-carriers for carrying the data, feeds back the signal-to-noise ratios of respective sub-carriers to the transmitter through a transmitter of the opposite terminal and a receiver of the local terminal, and weights the received data, stores them and provides them to the receiver of the opposite terminal for judging (step 603).

b. The receiver of the opposite terminal judges whether the data are correct (step 604); if the data are correct, the receiver of the opposite terminal outputs the data (step 605), the receiver of the opposite terminal sends the acknowledgement (ACK) indication to the transmitter of the local terminal through the transmitter of the opposite terminal and the receiver of the local terminal (step 606); if the data are incorrect, the receiver of the opposite terminal sends the negative acknowledgement (NACK) indication to the transmitter of the local terminal through the same route (step 608).

c. When receiving the acknowledgement (ACK) indication, the transmitter of the local terminal obtains new data as the data to be transmitted (step 607), the procedure returns to step a.

d. When receiving the negative acknowledgement (NACK) indication, the transmitter of the local terminal compares the signal-to-noise ratios of respective sub-carriers for carrying the data fed back from the receiver of the opposite terminal with a threshold, picks out the sub-carriers having the signal-to-noise ratios lower than the threshold, maps again the data carried by the sub-carriers having the signal-to-noise ratios lower than the threshold onto other sub-carriers having the higher signal-to-noise ratios according to a certain rule and retransmits them to the receiver of the opposite terminal (step 609).

e. The receiver of the opposite terminal receives the retransmitted data, estimates the signal-to-noise ratios of respective sub-carriers for carrying the data, and feeds back the signal-to-noise ratios of respective sub-carriers to the transmitter of the local terminal through the transmitter of the opposite terminal and the receiver of the local terminal (step 610); the receiver of the opposite terminal compares the signal-to-noise ratios of the respective sub-carriers transmitted last time with the same threshold as that in the transmitter of the local terminal, picks out the data of retransmitted part according to the same rule as that in the step d, weights the retransmitted data, and combines the weighted data with the corresponding data which are processed before, stores them and provides them to the receiver of the opposite terminal for judging (step 611), the procedure returns to step b.

In this method, steps 609, 610 and 611 are the key points of the invention.

Figure 7:
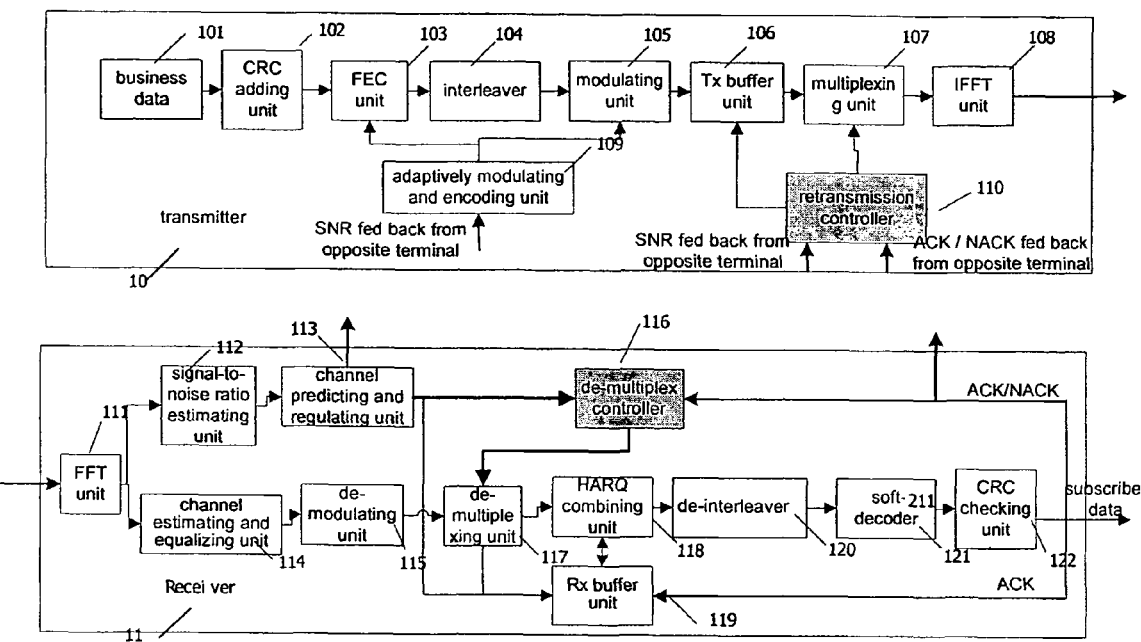
FIG. 7 is a schematic diagram of the structure of the communication system realizing this invention.

Meanwhile, the structure of a communication system realizing the method of the invention can be obtained from the embodiments. As shown in FIG. 7, the communication system of the invention comprises transmitter 10 and receiver 11, wherein transmitter 10 comprises transmitter buffer unit 106 and multiplexing unit 107, receiver 11 comprises signal-to-noise ratio estimating unit 113, receiver buffer unit 119, de-multiplexing unit 117, HARQ combining unit 118 and CRC checking unit 122. The communication system further comprises retransmission controller 110 connected with transmitter buffer unit 106 and multiplexing unit 107 and de-multiplex controller 116 coupled with signal-to-noise ratio estimating unit 113 and connected with de-multiplexing unit 117 and CRC checking unit 122, wherein retransmission controller 110 controls transmitter buffer unit 106 to get new data and controls multiplexing unit 107 to map the new data to be transmitted when obtaining the ACK indication fed back from the opposite communication terminal; compares the signal-to-noise ratios of respective sub-carriers for carrying the data fed back from the signal-to-noise ratio estimating unit of receiver 20 of the opposite communication terminal with a threshold to pick out the sub-carriers having the signal-to-noise ratios lower than the threshold and controls the multiplexing unit 107 to map again the data carried by the sub-carriers having the signal-to-noise ratios lower than the threshold onto other sub-carriers having higher signal-to-noise ratios for retransmission according to a certain rule when obtaining the NACK indication fed back from the receiver of the opposite communication terminal, wherein de-multiplex controller 116 controls de-multiplexing unit 117 to send the de-multiplexed data to HARQ combining unit 118 when obtaining the ACK indication output from the CRC checking unit; compares the signal-to-noise rations of the respective sub-carriers during transmitting the last time sent from signal-to-noise estimating unit 112 with the same threshold as that in the transmitter of the opposite terminal and controls the de-multiplexing unit 117 to send the de-multiplexed data of the retransmitted part to HARQ combining unit 118 according to the same rule as that in the transmitter of the opposite terminal when obtaining the NACK indication output from the CRC checking unit and in the case that receiver 11 receives the retransmitted data. In this system, receiver buffer unit 119 clears the data which are processed before and stored in the unit for HARQ combining when obtaining the ACK indication output from CRC checking unit 122; HARQ combining unit 118 weights the data processed by de-multiplexing unit 117 and combines the weighted data with the data which are processed before and stored in receiver buffer-storing unit 119, and then stores the processed data in receiver buffer-storing unit 119; and when obtaining the ACK indication receiver 11 outputs the processed data after the data are checked by CRC checking unit 122.

In this method, retransmission controller 110 and de-multiplex controller 116 added in the invention are provided within transmitter 10 and receiver 11 respectively in this embodiment, but it is unnecessary to limit them to this configuration, retransmission controller 110 and de-multiplex controller 116 can be included individually in a communication system comprising a transmitter and a receiver which are as a whole, as long as the relationship described above is satisfied.

Figure 8:
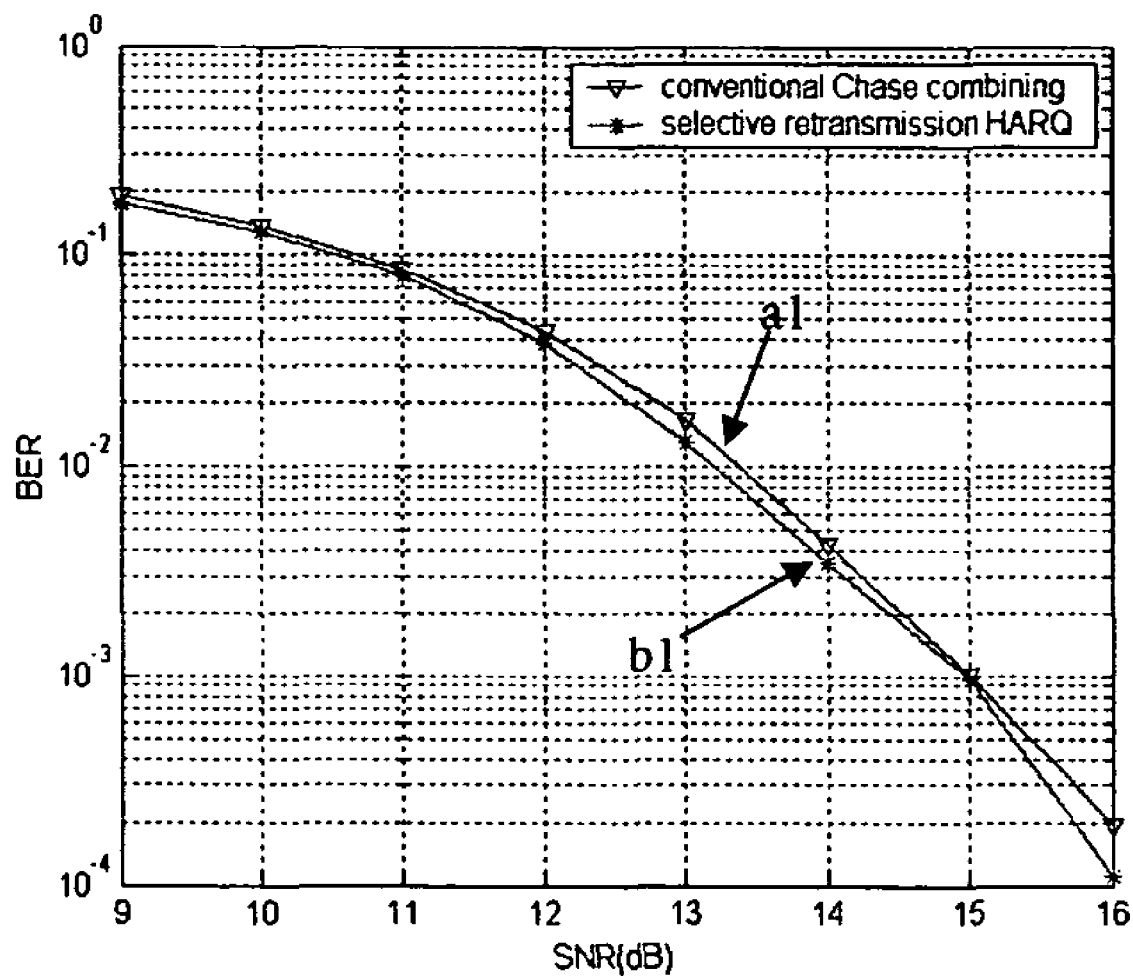
FIG. 8 is a graph of signal-to-noise ratio versus bit error rate for comparing the orthogonal frequency dividing multiplexing systems with hybrid automatic repeat request of the solution of this invention and the prior art.
Figure 9:
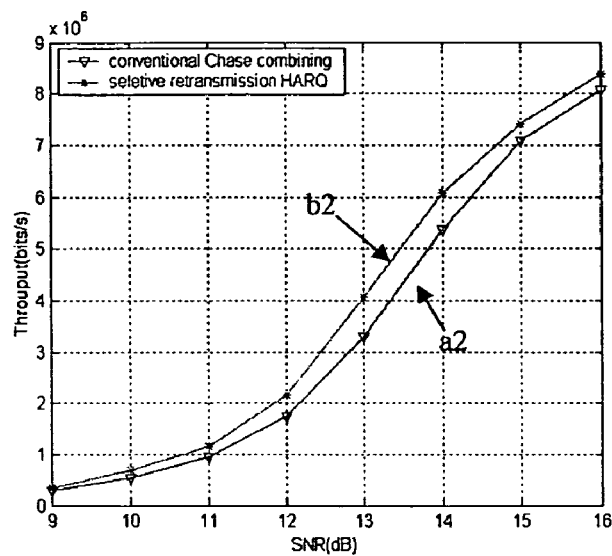
FIG. 9 is a graph of signal-to-noise ratio versus system throughput for comparing the orthogonal frequency dividing multiplexing systems with hybrid automatic repeat request of the solution of the invention and the prior art.

FIG. 8 and FIG. 9 show a graph of signal-to-noise ratio versus bit error rate and a graph of signal-to-noise ratio versus system throughput respectively for comparing the orthogonal frequency dividing multiplexing systems with hybrid automatic repeat request of the solution of the invention and the prior art. These comparing graphs shown in FIG. 8 and FIG. 9 are obtained in the following simulation conditions: an orthogonal frequency dividing multiplex (OFDM) system; 1024 sub-carriers; carrier frequency of 3.2 GHz; an AWGN+ outdoor multi-routes channel A; wireless velocity of mobile of 120 km/h; 1/3 Turbo coding manner; 16 QAM modulating manner; circle redundancy checking (CRC) bit of 24 bits;

perfect channel estimating and perfect signal-to-noise ratio estimating; simulation points of 1024*100; retransmissions of 3 times max.; Eb_N0-2.0 SNR threshold. Here, the SNR threshold for determining the cell-code to be retransmitted is a relative SNR value, which is 2.0 dB lower than the average channel SNR set during emulating. In FIG. 8, graph a1 is a graph of signal-to-noise ratio versus bit error rate of the orthogonal frequency dividing multiplexing systems with hybrid automatic repeat request of the prior art, graph b1 is the graph of signal-to-noise ratio versus bit error rate of the orthogonal frequency dividing multiplexing systems with hybrid automatic repeat request of the invention. As shown in FIG. 8, the bit error rate of the solution of the invention is always lower than that of the Chase combining method of the prior art, because the cell-codes to be retransmitted are always mapped onto the sub-carriers having the higher signal-to-noise ratios in this solution. In FIG. 9, graph a2 is a graph of signal-to-noise ratio versus system throughput of the orthogonal frequency dividing multiplexing systems with hybrid automatic repeat request of the prior art, b2 is a graph of signal-to-noise ratio versus the system throughput of the orthogonal frequency dividing multiplexing systems with hybrid automatic repeat request of the invention. As shown in FIG. 9, the throughput of the invention is always higher than that of the prior art.

Figure 10:
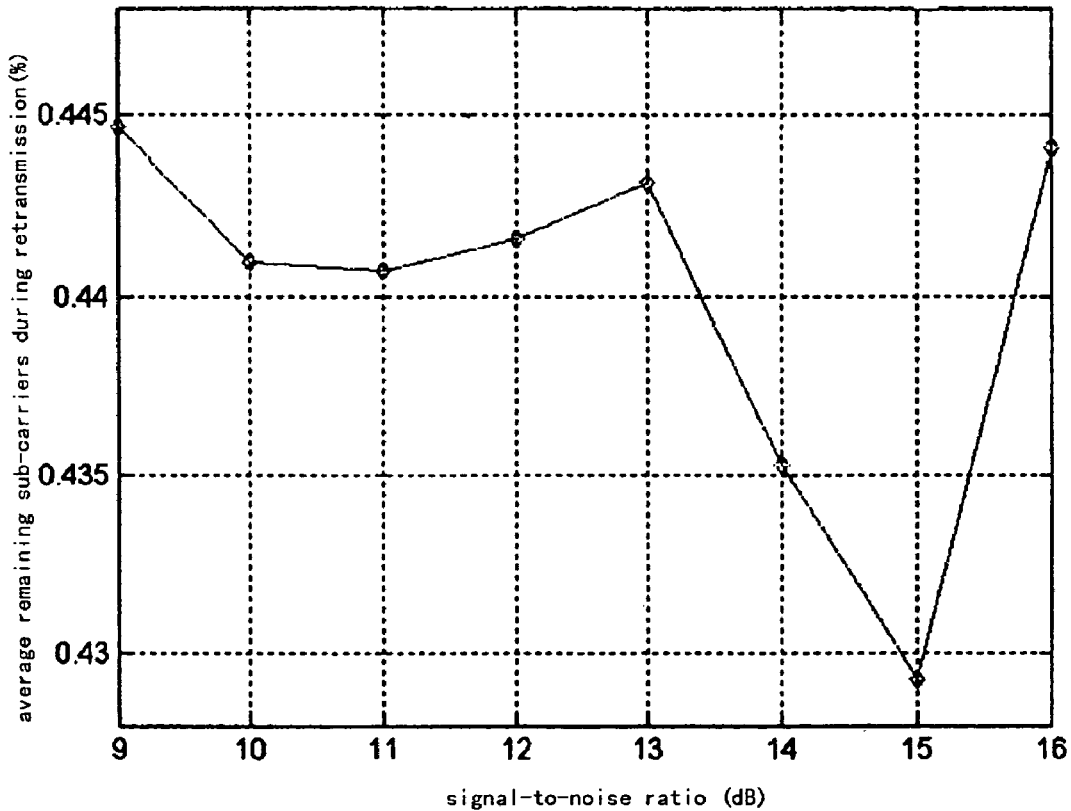
FIG. 10 is a graph showing the resource saved in the solution of the invention.

FIG. 10 shows the resources saved in the solution of the invention. As shown in FIG. 10, 40% sub-carriers can be saved on the average during each retransmission. These saved resources can be allocated to other subscribers, increasing greatly the system throughput.

As shown in FIG. 8, FIG. 9 and FIG. 10, the simulation results indicate that the solution of the invention can not only increase the system throughput, but also decrease effectively the bit error rate.

While the preferred embodiments of the invention are described above in detail, this description is not intended to limit the invention, and the true scope of the invention is defined by the appending claims.

What is claimed is:

1. A data transmitting method with hybrid automatic repeat request in multi-carrier system, wherein, the said method comprises the steps of:
   a. a transmitter of a local terminal transmitting data to a receiver of an opposite communication terminal, and the receiver of the opposite terminal receiving the data, estimating the signal-to-noise ratios of respective sub-carriers for carrying the data, feeding back the signal-to-noise ratios of respective sub-carriers to a transmitter of the local terminal through the transmitter of the opposite terminal and a receiver of the local terminal, weighting the received data, storing them and providing them to the receiver of the opposite terminal for judging;
   b. the receiver of the opposite terminal judging whether the data are correct, and outputting the data and sending an acknowledgement (ACK) indication to the transmitter of the local terminal through the transmitter of the opposite terminal and the receiver of the local terminal if the data are correct or sending a negative acknowledgement (NACK) indication to the transmitter of the local terminal through the same route if the data are incorrect;
   c. when receiving the acknowledgement (ACK) indication, the transmitter of the local terminal getting new data as the data to be transmitted and then returning to step a;
   d. when receiving the negative acknowledgement (NACK) indication, the transmitter of the local terminal comparing the signal-to-noise ratios of respective sub-carriers for carrying the data fed back from the receiver of the opposite terminal with a threshold, picking out the sub-carriers having the signal-to-noise ratios lower than the threshold, mapping again the data carried by the sub-carriers having the signal-to-noise ratios lower than the threshold onto other sub-carriers having the higher signal-to-noise ratios according to a certain rule and retransmits them to the receiver of the opposite terminal;
   e. the receiver of the opposite terminal receiving the data, estimating the signal-to-noise ratios of respective sub-carriers for carrying the data and feeding back the signal-to-noise ratios of respective sub-carriers to the transmitter of the local terminal through the transmitter of the opposite terminal and the receiver of the local terminal, at the same time, comparing the signal-to-noise ratios of respective sub-carriers transmitted last time with the same threshold as that in the transmitter of the local terminal, picking out the data of retransmitted part according to the same rule as that in the step d, weighting the retransmitted data, combining the weighted data with the data which are processed before, storing them and providing them to the receiver of the opposite terminal for judging, then returning to step b.

2. The data transmitting method with hybrid automatic repeat request in multi-carrier system according to claim 1, wherein said multi-carrier system is an orthogonal frequency dividing multiplexing system.

3. The data transmitting method with hybrid automatic repeat request in multi-carrier system according to claim 1, wherein the method further comprises a step for forward error correction (FEC) coding the data to be transmitted before the transmitter of the local terminal transmits the data to the receiver of the opposite terminal in step a, at the same time, the manner of forward error correction (FEC) coding needs to be adaptively regulated according to the values of the fed back signal-to-noise ratios of respective sub-carriers.

4. The data transmitting method with hybrid automatic repeat request in multi-carrier system according to claim 1, wherein the threshold in said step d is obtained through simulation calculation and is fed back along with the NACK indication from the opposite terminal to the transmitter of the local terminal.

5. The data transmitting method with hybrid automatic repeat request in multi-carrier system according to claim 1, wherein said estimating the signal-to-noise ratio of respective sub-carriers in step a and step e further includes steps for predicting the channel after the signal-to-noise ratios of the received data are estimated and adjusting the values of the signal-to-noise ratios according to the predicting result of the future channel performance.

6. The data transmitting method with hybrid automatic repeat request in multi-carrier system according to claim 1, wherein said weighting the data in step a and step b is that the data are weighted with the average SNR of all sub-carriers for carrying the data.

7. The data transmitting method with hybrid automatic repeat request in multi-carrier system according to claim 1, wherein said weighting the data in step a and step b is that each data symbol in the transmitted block of data is weighted by taking SNR of the sub-carrier for carrying the data symbol as weight factor.

8. The data transmitting method with hybrid automatic repeat request in multi-carrier system according to claim 1, wherein that said step d further includes that the sub-carriers which are not used to map the data to be retransmitted are used to transmit new data of the subscriber, or allocated dynamically to other subscribers in the case of multi-subscriber multiplex.

9. The data transmitting method with hybrid automatic repeat request in multi-carrier system according to claim 1, wherein the sub-carriers in the method can be substituted by sub-bands, and a signal-to-noise ratio of a sub-band is the average value of signal-to-noise ratios of all the sub-carriers in the sub-band.

10. An orthogonal frequency dividing multiplex communication system comprising a transmitter and a receiver, the said transmitter comprising a transmitter buffer unit and a multiplexing unit, the said receiver comprising a signal-to-noise ratio estimating unit, a receiver buffer unit, a de-multiplexing unit, a HARQ combining unit and a CRC checking unit, wherein said communication system further comprises a retransmission controller connected with the transmitter buffer unit and the multiplexing unit, and a de-multiplex controller coupled with the signal-to-noise ratio estimating unit and connected with the CRC checking unit and the de-multiplexing unit, wherein said retransmission controller is used to control the transmitter buffer unit to get new data and to control the multiplexing unit to map the new data to be transmitted when obtaining the ACK indication fed back from the opposite communication terminal, and to compare the signal-to-noise ratios of respective sub-carriers for carrying the data fed back from the signal-to-noise ratio estimating unit of the receiver of the opposite communication terminal with a threshold to pick out the sub-carriers having the signal-to-noise ratios lower than the threshold and to control the multiplexing unit to map again the data carried by the sub-carriers having the signal-to-noise ratios lower than the threshold onto other sub-carriers having the higher signal-to-noise ratios for retransmission according to a certain rule when receiving the NACK indication fed back from the receiver of the opposite communication terminal; said de-multiplex controller is used to control the de-multiplexing unit to send the de-multiplexed data to the HARQ combining unit when obtaining the ACK indication output from the CRC checking unit, and to compare the signal-to-noise rations of respective sub-carriers transmitted last time sent from the signal-to-noise estimating unit with the same threshold as that in the transmitter of the opposite terminal and to control the de-multiplexing unit to send the de-multiplexed data of the retransmitted part to the HARQ combining unit according to the same rule as that in the transmitter of the opposite terminal in the case of the receiver receiving the retransmitted data when obtaining the NACK indication output from the CRC checking unit; said receiver buffer unit clears the data for HARQ combining which are processed before and stored therein when obtaining the ACK indication output from the CRC checking unit; said HARQ combining unit weights the data processed by said de-multiplexing unit, combines the weighted data with the data which are processed before and stored in the receiver buffer unit, and then stores the processed data in the receiver buffer unit; when obtaining the ACK indication, the receiver outputs the data checked by the CRC checking unit.

11. The orthogonal frequency dividing multiplex communication system according to claim 10, wherein a channel predicting and regulating unit used to predict the channel performance in advance and regulate the values of the signal-to-noise ratios obtained by the signal-to-noise ratio estimating unit is connected to said signal-to-noise ratio estimating unit.

12. A transmitter in an orthogonal frequency dividing multiplex communication system, comprising a transmitter buffer unit and a multiplexing unit, wherein the transmitter further comprises a retransmission controller connected with the transmitter buffer unit and the multiplexing unit and used to control the transmitter buffer unit to get new data and to control the multiplexing unit to map the data for transmitting when receiving an ACK indication fed back from an opposite communication terminal, and used to compare signal-to-noise ratios of respective sub-carriers for carrying the data fed back from a receiver of the opposite communication terminal with a threshold to pick out the sub-carriers having the signal-to-noise ratios lower than the threshold and to control the multiplexing unit to map the data carried by the sub-carriers having the signal-to-noise ratios lower than the threshold onto other sub-carriers having the higher signal-to-noise ratios for retransmission according to a certain rule when receiving a NACK indication fed back from the receiver of the opposite communication terminal.

13. A receiver in an orthogonal frequency dividing multiplex communication system comprising a signal-to-noise ratio estimating unit, a receiver buffer unit, a de-multiplexing unit, a HARQ combining unit and a CRC checking unit, wherein the receiver further comprises a de-multiplex controller coupled with the signal-to-noise ratio estimating unit, and connected with the de-multiplexing unit and the CRC checking unit and used to control the de-multiplexing unit to send the de-multiplexed data to the HARQ combining unit when obtaining a ACK indication output from the CRC checking unit, and used to compare the signal-to-noise ratios of respective sub-carriers transmitted last time from the signal-to-noise estimating unit with the same threshold as that in a transmitter of an opposite terminal and to control the de-multiplexing unit to send the de-multiplexed data of the retransmitted part to the HARQ combining unit according to the same rule as that in the transmitter of the opposite terminal in the case of the receiver receiving the retransmitted data when obtaining the NACK indication output from the CRC checking unit, wherein said receiver buffer unit clears the data which are processed before and stored in the unit for HARQ combining when obtaining the ACK indication output from the CRC checking unit, said HARQ combining unit weights the data processed by said de-multiplexing unit and combines the weighted data with the data which are processed before and stored in the receiver buffer unit and then stores the processed data in the receiver buffer unit, at the same time, when obtaining the ACK indication, the receiver outputs the data checked by the CRC checking unit.

14. The receiver in the orthogonal frequency dividing multiplex communication system according to claim 13, wherein a channel predicting and regulating unit used to predict the channel performance in advance and regulate the values of the signal-to-noise ratios obtained by the signal-to-noise ratio estimating unit is connected to said signal-to-noise ratio estimating unit.

15. The transmitter in the orthogonal frequency dividing multiplex communication system according to claim 12, wherein only data carried by the sub-carriers having the signal-to-noise ratios lower than the threshold is retransmitted.

16. An orthogonal frequency dividing multiplex communication system comprising:
a transmitter transmitting data and comprising a multiplexing unit and a retransmission controller; and
a receiver receiving data and comprising a signal-to-noise ratio determining unit that determines the signal-to-noise ratio of the received data,
wherein, if the receiver determines that the data received from the transmitter is incorrect, the retransmission controller compares a signal-to-noise ratio of at least one sub-carrier carrying the received data with a threshold value, select at least one of said sub-carrier having signal-to-noise ratios lower than the threshold value, and controls the multiplexing unit to remap the data carried by the sub-carriers having the signal-to-noise ratios lower than the threshold onto other sub-carriers having higher signal-to-noise ratios for retransmission.

17. The orthogonal frequency dividing multiplex communication system according to claim 16, wherein the receiver further comprises a hybrid automatic repeat request combining unit that combines the retransmitted data with the data received previously.

18. A transmitter in an orthogonal frequency dividing multiplex communication system, comprising:
    a multiplexing unit; and
    a retransmission controller,
    wherein, if the transmitter determines that data received from a transmitter of an opposite terminal is incorrect, the transmitter compares a signal-to-noise ratio of at least one sub-carrier carrying the received data with a threshold value, and controls the multiplexing unit to remap data carried by at least one sub-carrier having a signal-to-noise ratio lower than the threshold value onto other sub-carriers having higher signal-to-noise ratios for retransmission.

19. A receiver in an orthogonal frequency dividing multiplex communication system, comprising:
    a signal-to-noise ratio estimating unit;
    a de-multiplexing unit;
    a de-multiplexing controller; and
    a hybrid automatic repeat request combining unit,
    wherein:
        if the receiver determines that received data is incorrect, the de-multiplexing controller compares signal-to-noise ratios of at least one sub-carrier transmitted previously with a threshold value and controls the de-multiplexing unit to send de-multiplexed data of a retransmitted part to the hybrid automatic repeat request combining unit; and
    if the receiver determines that the received data is correct, the hybrid automatic repeat request combining unit weights retransmitted data processed by the de-multiplexing unit and combines the weighted data with data received previously.

* * * * *